UNITED STATES PATENT OFFICE.

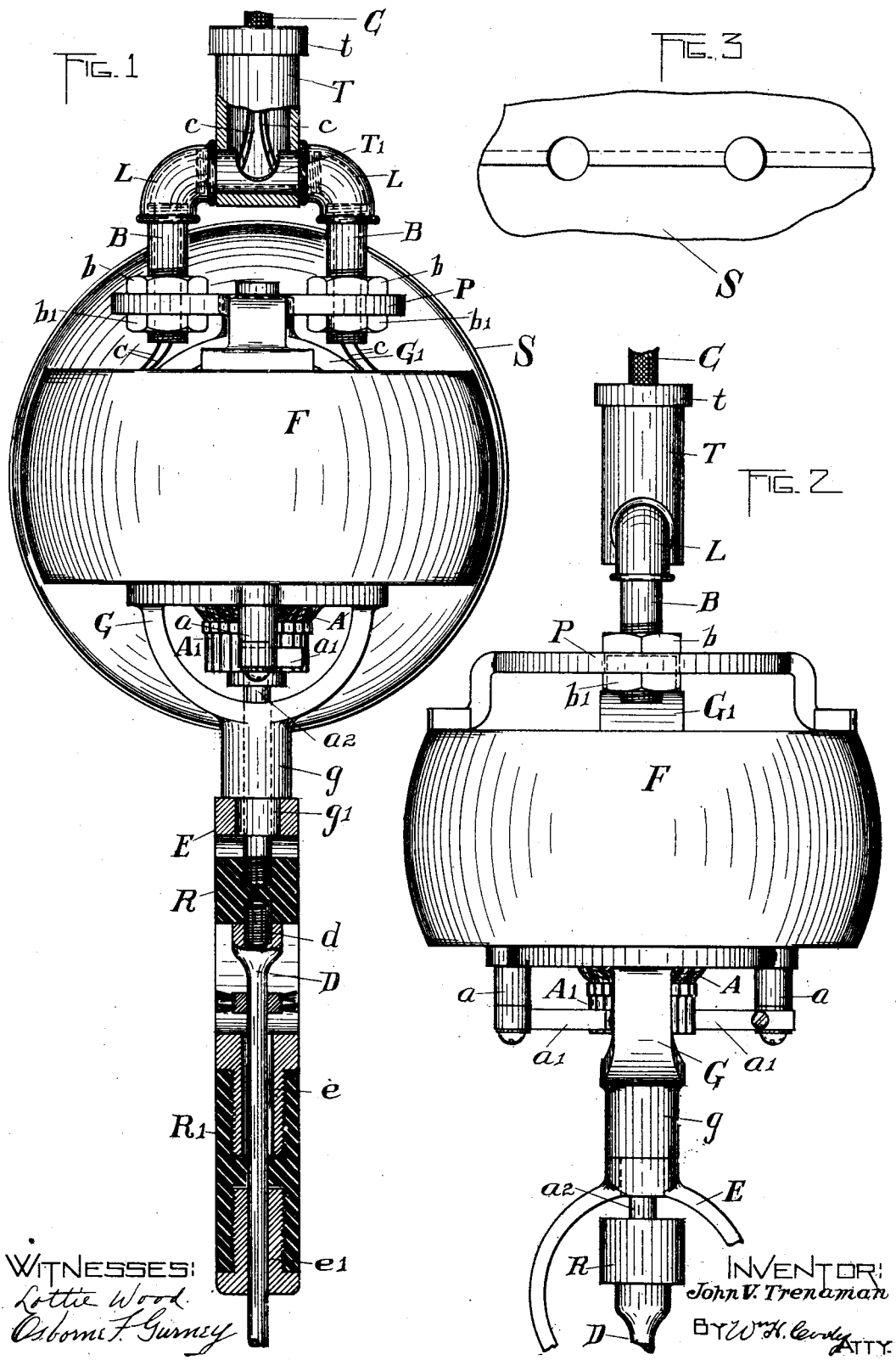

JOHN V. TRENAMAN, OF NEWARK, NEW JERSEY.

ELECTRIC DENTAL ENGINE.

955,484.  Specification of Letters Patent.  Patented Apr. 19, 1910.

Application filed January 8, 1908. Serial No. 409,761.

*To all whom it may concern:*

Be it known that I, JOHN V. TRENAMAN, a citizen of the United States, and a resident of Newark, in the county of Essex and State of New Jersey, have invented a new and Improved Electric Dental Engine, of which the following is a specification.

This invention relates to electric engines of that class intended to be flexibly and adjustably supported, such as those used by dentists and for other like purposes, the object of my invention being to provide a construction and arrangement of the parts of the engine which will permit the use of an economically constructed pivotal support for the motor, flexibly connected to the fixed element of the motor and with the pivotal point a short distance above the center of gravity of the motor and with the pivotal support of such a character that the motor may be readily removed from the support by disconnecting the conductors from the field and the armature without the necessity for disassembling the motor as to its essential features or elements.

I desire to call attention especially to the fact that features of my present invention are adapted to adjustably support electrically energized devices in general, although in the accompanying drawings they are shown as coöperatively combined in an electric dental engine.

The accompanying drawings illustrating my invention are as follows:—Figure 1 is a side view of the electrically energized part of my engine with one half of the shield removed to show the manner of supporting and connecting the parts. The lower part of the motor is also shown in vertical central section. Fig. 2 is a side view of the upper portion of the parts seen in Fig. 1 and taken at right angles to the plane of Fig. 1 and with the inclosing shield entirely removed. Fig. 3 is a top view of a portion of the shield.

Similar letters refer to similar parts throughout the several views.

Referring to the drawings,—F is the field, A the armature, $A^1$ the commutator. The brush carrying posts $a$ are secured in the bearing member G, and to these posts $a$ are secured the brushes $a^1$.

$a^2$ is the armature shaft rotatable in its bearing in the member G.

The upper end of the shaft $a$ is rotatable in the upper bearing member $G^1$.

The field, armature, commutator and brushes are inclosed within a spherical shield S formed in two hemispherical portions, the plane of the union between them being parallel to the plane of Fig. 1 and approximately coincident with the axis of the shaft $a^2$.

The bearing members G and $G^1$ are secured to the field F in the usual way. The hemispherical shield members S are secured to the field magnet F and on the upper side of the field magnet F is secured a cross plate P, the main body portion of which is raised considerably above the plane of the upper side of the field magnet and through this plate P there is provided a suitable opening to receive the upper end of the bearing member $G^1$.

Secured on the cross plate P, by suitable locking nuts threaded thereon, are seen two tubular members B extending vertically upward and having screwed thereon two elbows L, between and into which is threaded a short section of horizontal pipe $T^1$ having at its middle a portion of its upper side removed for purposes later to be explained. The pipe $T^1$ is rotatively mounted in the tubular cord suspended member T having a screw cap $t$ to which the cable C is secured and which is provided with a passage through which the electrical conductors $c$ carried by the cable extend to the motor. These tubular members B extend through suitable openings therefor in the hemispherical sections S, as indicated in Fig. 3.

A yoke member E is forced and secured onto the shouldered lower end $g^1$ of the downward projection $g$ on the bearing member G. This yoke member E is circular in form and has at its lower end a downwardly extending shouldered portion $e$, onto and over which there is threaded the insulating member $R^1$, into the lower end of which there is similarly threaded the bearing plug $e^1$, preferably of brass or bronze. The lower end of the armature shaft $a^2$ is threaded into the cylindrical member R, preferably of fiber or like material, and into which there is also threaded the upper end of the flexible shaft D by means of the stud $d$. This shaft D extends downwardly through the yoke member E, the insulating member $R^1$ and the bearing plug $e^1$. On the flexible shaft D and within the yoke member E there may be secured the usual circular cleaning brush, as seen in Fig. 1.

The horizontally disposed connecting pipe T¹ is freely rotatable within the hole therefor through the cord suspended member T and this member T¹ has a considerable portion of its upper side removed to permit the motor to be swung to a horizontal position without interfering with the conductors c which are contained within the cable C, which in turn has secured thereon underneath the cap piece t any suitable suspending button to sustain the weight of the motor entirely from that portion of the cable C above such button and to relieve the conductors c from any strain resulting from the suspending mechanism.

In assembling the suspending mechanism, the tubes B are screwed into the elbows L and then the pipe T¹ is secured into one of such elbows L and then inserted through the hole therefor in the member T and the other elbow L is then screwed thereon and the pipes P caused to lie in the same plane and then the upper locking nuts b are screwed onto the pipes B and such pipes inserted through the holes therefor in the cross plate P, then the nuts b¹ are screwed up, firmly holding the parts together, and the plate P is then screwed to the field F. The conductors c are extended, two of them, down through each of the tubes B and are connected to the field coil and the armature brushes in the usual way.

From the foregoing description, it is believed that the construction and operation of my engine is sufficiently clear to call for no further explanation herein.

What I claim is:—

1. In combination with a motor provided with a field magnet and an armature, a connecting plate secured to the field magnet but spaced therefrom with the plane of the plate vertical to the axis of the armature of the motor; a cord suspended element; a U shaped tubular element connected to the plate at its ends and having its connecting bend extending through and articulating with the lower end of the cord suspended member; such cord suspended member, each limb of such U shaped tubular member and such plate provided with an uninterrupted passage way therethrough; electric supply conductors for the motor extending through such cord suspended member, such U shaped member and such plate, the connecting portion of such U shaped member partially removed to receive such conductors and permit such member to rotatably oscillate in such cord suspended member.

2. In combination with a motor provided with a field magnet and an armature, a connecting plate secured to the field magnet but spaced therefrom with the plane of the plate vertical to the axis of the armature of the motor; a cord suspended element; a U shaped tubular element removably connected to the plate at its ends and having its connecting bend extending through and articulating with the lower end of the cord suspended member; such cord suspended member, each limb of such U shaped tubular member and such plate provided with an uninterrupted passage way therethrough; electric supply conductors for the motor extending through such cord suspended member, such U shaped member and such plate, the connecting portion of such U shaped member partially removed to receive such conductors and permit such member to rotatably oscillate in such cord suspended member.

3. In combination with a motor provided with a field magnet and an armature, a connecting plate secured to the field magnet but spaced therefrom with the plane of the plate vertical to the axis of the armature of the motor; a cord suspended element; a U shaped tubular element connected to the plate at its ends and having its connecting bend extending through and articulating with the lower end of the cord suspended member; such cord suspended member, each limb of such U shaped tubular member and such plate provided with an uninterrupted passageway therethrough; electric supply conductors for the motor extending through such cord suspended member, such U shaped member and such plate, the connecting portion of such U shaped member partially removed to receive such conductors and permit such member to rotatably oscillate in such cord suspended member, such U shaped tubular member comprising two elbows and three sections of straight pipe with the free ends of two of such sections of pipe extending through and secured in holes therefor in such connecting plate with a portion of the middle section of such pipe removed to receive the conductors and permit, without injury thereto, the oscillation of such section in such cord suspended member.

4. In combination with a motor provided with a field magnet and an armature, a connecting plate removably secured to the field magnet but spaced therefrom with the plane of the plate vertical to the axis of the armature of the motor; a cord suspended element; a U shaped tubular element connected to the plate at its ends and having its connecting bend extending through and articulating with the lower end of the cord suspended member; such cord suspended member, each limb of such U shaped tubular member and such plate provided with an uninterrupted passage way therethrough; electric supply conductors for the motor extending through such cord suspended member, such U shaped member and such plate, the connecting portion of such U shaped member partially removed to receive such conductors and permit such member to rotatably oscillate in such cord suspended member.

5. In combination with a motor provided with a field magnet and an armature, a connecting plate removably secured to the field magnet but spaced therefrom with the plane of the plate vertical to the axis of the armature of the motor; a cord suspended element; a U shaped tubular element connected to the plate at its ends and having its connecting bend extending through and articulating with the lower end of the cord suspended member; such cord suspended member, each limb of such U shaped tubular member and such plate provided with an uninterrupted passageway therethrough; electric supply conductors for the motor extending through such cord suspended member, such U shaped member and such plate, the connecting portion of such U shaped member partially removed to receive such conductors and permit such member to rotatably oscillate in such cord suspended member, such U shaped tubular member comprising two elbows and three sections of straight pipe with the free ends of two of such sections of pipe extending through and secured in holes therefor in such connecting plate with a portion of the middle section of such pipe removed to receive the conductors and permit, without injury thereto, the oscillation of such section in such cord suspended member, whereby such cord suspended member and such U shaped tubular member may be assembled in individual sections and thereafter the plate added thereto, each such member being separately inserted over the conductors to facilitate assemblage.

6. In combination with a motor provided with a field magnet and an armature, a connecting plate secured to the field magnet and adapted to make connection with an element articulating with the cord suspended element; a cord suspended element; a tubular element connected to the plate at one end and articulating with the cord suspended element at its other end; such cord suspended element, each limb of such tubular element and such plate provided with an uninterrupted passageway therethrough; electric supply conductors for the motor extending through such cord suspended element, such tubular element and such plate, the connecting portion of such tubular element partially removed to receive such conductors and permit such element to rotatably oscillate in such cord suspended element.

7. In combination with a motor provided with a field magnet and an armature, a connecting plate secured to the field magnet and adapted to make connection with an element articulating with the cord suspended element; a cord suspended element; a tubular element removably connected to the plate at one end and articulating with the cord suspended element at its other end; such cord suspended element, each limb of such tubular element and such plate provided with an uninterrupted passageway therethrough; electric supply conductors for the motor extending through such cord suspended element, such tubular element and such plate, the connecting portion of such tubular element partially removed to receive such conductors and permit such element to rotatably oscillate in such cord suspended element.

8. In combination with a motor provided with a field magnet and an armature, a connecting plate secured to the field magnet and adapted to make connection with an element articulating with the cord suspended element; a cord suspended element; a tubular element connected to the plate at one end and articulating with the cord suspended element at its other end; such cord suspended element, each limb of such tubular element and such plate provided with an uninterrupted passageway therethrough; electric supply conductors for the motor extending through such cord suspended element, such tubular element and such plate, the connecting portion of such tubular element partially removed to receive such conductors and permit such element to rotatably oscillate in such cord suspended element, such tubular element comprising two elbows and three sections of straight pipe with the free ends of two of such sections of pipe extending through and secured in holes therefor in such connecting plate with a portion of the middle section of such pipe removed to receive the conductors and permit, without injury thereto, the oscillation of such section in such cord suspended element.

9. In combination with a motor provided with a field magnet and an armature, a connecting plate removably secured to the field magnet and adapted to make connection with an element articulating with the cord suspended element; a cord suspended element; a tubular element connected to the plate at one end and articulating with the cord suspended element at its other end; such cord suspended element, each limb of such tubular element and such plate provided with an uninterrupted passageway therethrough; electric supply conductors for the motor extending through such cord suspended element, such tubular element and such plate, the connecting portion of such tubular element partially removed to receive such conductors and permit such element to rotatably oscillate in such cord suspended element.

10. In combination with a motor provided with a field magnet and an armature, a connecting plate removably secured to the field magnet and adapted to make connection with an element articulating with the cord suspended element; a cord suspended element; a tubular element connected to the plate at one end and articulating with the cord suspended element at its other end; such cord suspended element, each limb of such tubular element and such plate provided with an uninterrupted passageway therethrough; electric supply conductors for the motor extending through such cord suspended element, such tubular element and such plate, the connecting portion of such tubular element partially removed to receive such conductors and permit such element to rotatably oscillate in such cord suspended element, such tubular element comprising two elbows and three sections of straight pipe with the free ends of two of such sections of pipe extending through and secured in holes therefor in such connecting plate with a portion of the middle section of such pipe removed to receive the conductors and permit, without injury thereto, the oscillation of such section in such cord suspended element, whereby such cord suspended element and such tubular element may be assembled in individual sections and thereafter the plate added thereto, each such element and section being separately inserted over the conductors to facilitate assemblage.

JOHN V. TRENAMAN.

Witnesses:
LOTTIE WOOD,
OSBORNE F. GURNEY.